Nov. 22, 1932.  R. J. MUIR  1,888,285
LAWN MOWER SHARPENER
Filed Oct. 28, 1931  2 Sheets-Sheet 1

R. J. Muir
INVENTOR

By: Marks & Clerk
ATTYS.

Nov. 22, 1932.  R. J. MUIR  1,888,285

LAWN MOWER SHARPENER

Filed Oct. 28, 1931   2 Sheets-Sheet 2

R. J. Muir
INVENTOR

By: Marks & Clerk
Attys.

Patented Nov. 22, 1932

1,888,285

UNITED STATES PATENT OFFICE

ROBERT JOHN MUIR, OF MOSMAN, NEAR SYDNEY, NEW SOUTH WALES, AUSTRALIA

LAWN MOWER SHARPENER

Application filed October 28, 1931, Serial No. 571,605, and in Australia April 15, 1931.

This invention relates to lawn mowers in which a plurality of longitudinally disposed and circumferentially spaced blades revolve against a stationary blade or ground plate and which blades need sharpening at frequent intervals to keep the machine in condition to cut efficiently and to reduce the effort necessitated in driving it in use.

And this invention has been specially devised in order to provide an improved lawn mower sharpener of simple, cheap, durable, handy and effective construction adapted for ready application to and removal from a mower whereby the revolvable blades are all uniformly ground or sharpened by traversing the mower, one construction being adapted for application at the front of the mower and the other for application at the rear thereof, but both functioning in the same manner.

In order that the invention and practical applications thereof will be readily understood the same will be described with reference to the accompanying drawings in which;—

Figure 1:
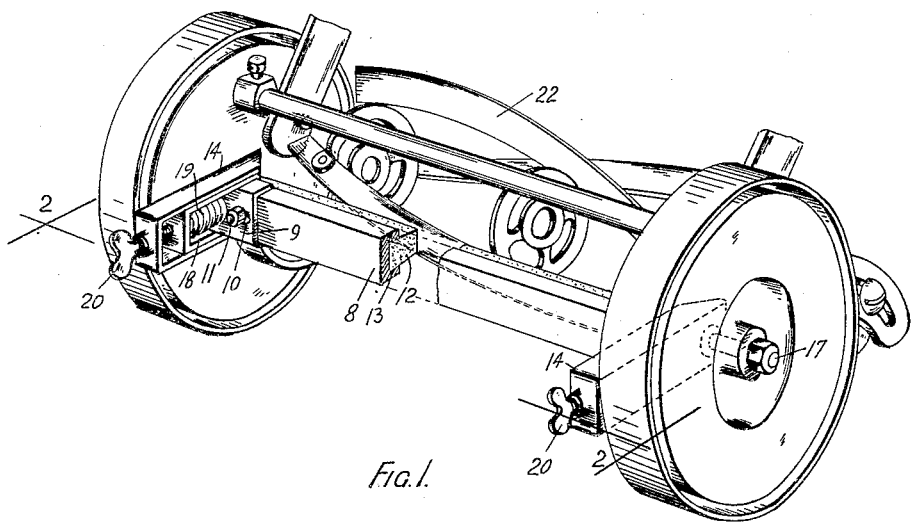
Figure 2:
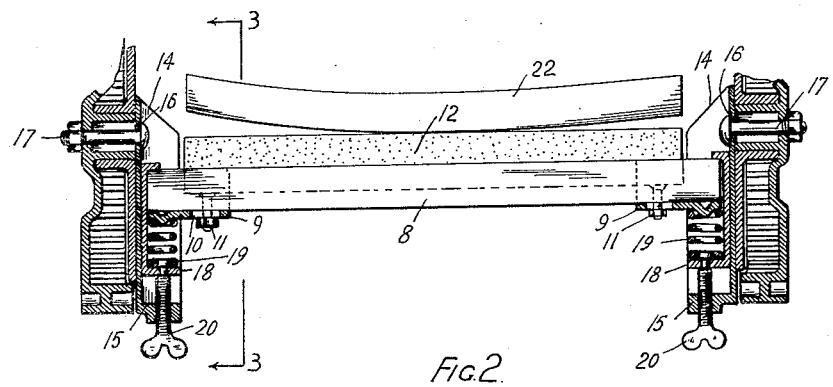
Figure 3:
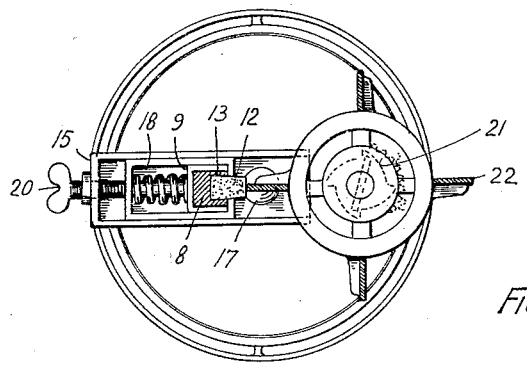
Figure 4:
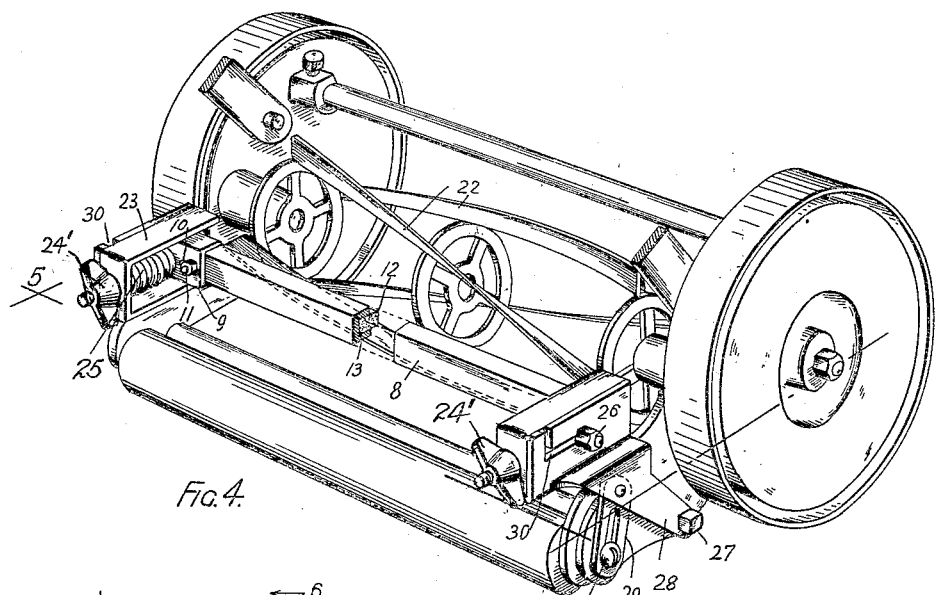
Figure 5:
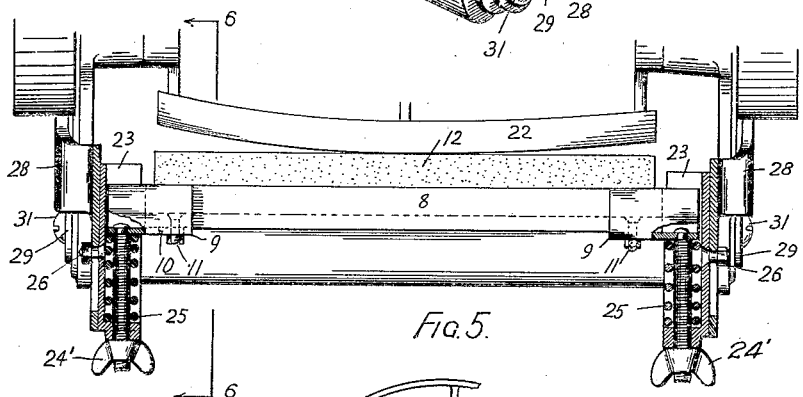
Figure 6:
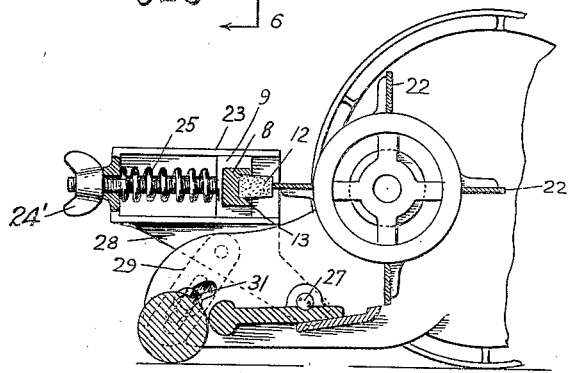

Figure 1 is a perspective of the improved sharpener applied at the front of a mower, Figure 2 is a fragmentary section on the plane 2—2 in Figure 1, Figure 3 is a partial sectional elevation on the line 3—3 in Figure 2, Figure 4 is a perspective of the improved sharpener applied at the rear of a mower, Figure 5 is a fragmentary section on the plane 5—5 in Figure 4, and Figure 6 is a partial sectional elevation on the line 6—6 in Figure 5.

The improved lawn mower sharpener (Figures 1 to 3) comprises essentially an abrasive carrier 8 conveniently in the form of a metal channel and preferably with ends 9 having slots 10 and secured by bolts 11 to permit of adjustment and application to mowers of varying widths within reasonable limits, abrasive material in the form of a stone 12 secured in said carrier, such as by a dovetail formation 13, and projecting transversely therefrom, a pair of channelled supports 14 each with a closed end 15 and an orifice 16 near the other end for securing it upon the axle bolt 17 at each end of the mower, a mounting member in the form of a slidable cage 18 in the support 14 to receive the end of the carrier 8, an expansion spring 19 between the inner end of the cage 18 and the carrier 8 to hold the latter, and an adjusting screw 20 threaded through the closed end 15 of the support 14 and revolvably engaged with the adjacent end of the cage 18.

The sharpener is removably attached as shown in Figures 1 to 3, then by interchange of the usual transmitting pinions 21 to opposite wheels, adjusting the abrasive 12 towards the revolvable blades 22 of the mower, applying oil to the abrasive, and traversing the mower in overturned position so that said blades 22 will revolve clear of grass, they will revolve in reverse direction to the usual cutting direction, and frictioning past the abrasive 12 will be ground or sharpened, whereafter the sharpener is removed, the pinions 21 replaced in respective wheels, and the ground blade being ground by the particles of abrasive and oil adhering to the revolving blades and the frictioning thereof against said blade, the mower is ready for use.

In the construction and arrangement illustrated in Figures 4 to 6 the improved sharpener is constructed for application at the rear of the mower and is preferably longitudinally adjustable to permit its application to mowers of varying widths within reasonable limits, the carrier 8 is preferably provided with ends 9 which have slots 10 and are secured by screw bolts 11 to permit of extension according to varying widths of mowers, though the extensible ends may be omitted, each end of the carrier 8 is mounted in channelled supports 23 by bolt 24 through the medium of the wing nut 24' said bolt being swivelly connected with the end and is encircled by an expansion spring 25 to press the carrier end forwardly, and the support 23 has a laterally projecting clamping bolt 26. Affixable at each end of the rear of the mower by the ground blade bolt 27 is a bracket 28 with an orifice for said bolt, a longitudinally slotted strut 29 hinged thereto, and an open slot 30 in the top, the strut 29 being secured by and adjusted upon the roller bracket bolt 31, and the abrasive carrier support 23 is engaged at each end with the bracket 28 by entering the clamping bolt 26 in the slot 30. The operation of sharpening is then effected as before described, and thereafter only the abrasive carrier 8 need be removed, as the brackets 28 may be left in place ready for further application of said carrier and abrasive.

If desired the abrasive carrier may be in the form of a rod or bar with an abrasive formed thereon or thereabout, and its ends be adapted for engagement in the supports as shown in Figures 1 to 3 or as shown in Figures 4 to 6, the ends of a round rod being squared for the purpose and to prevent it and the abrasive rotating.

I claim:—

1. An improved lawn mower sharpener comprising a hollow longitudinally open abrasive carrier with an abrasive exposed therefrom, a pair of channelled supports each with one end of the carrier slidably engaged therein, each support being adapted for engagement with a bracket and having adjusting means whereby the carrier and abrasive are resiliently adjustable in relation to the revolving blades of the mower, and a pair of brackets each adapted for affixing at one end of the rear of the mower by the ground blade and roller bracket bolts and to be engaged by and support the abrasive carrier support.

2. An improved lawn mower sharpener comprising a hollow longitudinally open abrasive carrier with abrasive material exposed therefrom, a pair of channelled supports each with one end of the carrier slidable longitudinally therein, each support having a clamping screw outwardly projecting from the side wall and one end closed with an adjusting bolt therethrough and engaged with said carrier end and having an expansion spring about its stem between said end and said closed end, a pair of brackets each for affixing at one end of the rear of the mower and having an orifice for engagement upon the ground blade bolt, a hinged and longitudinally slotted strut for engagement upon the roller bracket bolt, and an open slot in the top for engagement therein of the clamping screw of the support.

3. An improved lawn mower sharpener as claimed in claim 2 hereof in which the abrasive carrier is longitudinally adjustable at each end.

ROBERT JOHN MUIR.